(12) United States Patent
Chen et al.

(10) Patent No.: US 11,880,311 B2
(45) Date of Patent: Jan. 23, 2024

(54) METHODS FOR CONTROLLING ASYNCHRONOUS FIFO MEMORY AND DATA TRANSMISSION SYSTEM UTILIZING THE SAME

(71) Applicant: Realtek Semiconductor Corp., HsinChu (TW)

(72) Inventors: Yuefeng Chen, Suzhou (CN); Hui Gu, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/881,634

(22) Filed: Aug. 5, 2022

(65) Prior Publication Data

US 2023/0236989 A1    Jul. 27, 2023

(30) Foreign Application Priority Data

Jan. 27, 2022   (CN) .......................... 202210097466.2

(51) Int. Cl.
  *G06F 12/00* (2006.01)
  *G06F 12/123* (2016.01)
(52) U.S. Cl.
  CPC ................................ *G06F 12/124* (2013.01)
(58) Field of Classification Search
  CPC ......... G06F 12/00; G06F 12/124; G06F 13/00
  See application file for complete search history.

(56) References Cited

U.S. PATENT DOCUMENTS

| 5,673,398 A * | 9/1997 | Takeda ................ G06F 13/1689 710/61 |
| 6,388,464 B1 * | 5/2002 | Lacey ................ H03K 19/1776 326/40 |
| 6,509,851 B1 * | 1/2003 | Clark ...................... H03M 9/00 345/533 |
| 9,021,280 B1 | 4/2015 | Prasad |
| 10,579,331 B2 | 3/2020 | Strode |
| 10,592,442 B2 | 3/2020 | Born |
| 2004/0015666 A1 * | 1/2004 | Rojas ....................... G06F 5/12 711/159 |

* cited by examiner

*Primary Examiner* — Tuan V Thai
(74) *Attorney, Agent, or Firm* — Winston Hsu (57) ABSTRACT

A method for controlling operations of an asynchronous FIFO memory includes: determining a current depth of the asynchronous FIFO memory according to at least one of a clock ratio, a burst length and a continuous transmission length, where the clock ratio is a ratio of a frequency of a first clock signal used by a master device to a frequency of a second clock signal used by a slave device; configuring one or more entries of the asynchronous FIFO memory to be used according to the current depth; and controlling a plurality of FIFO clock signals provided to the asynchronous FIFO memory according to the current depth. One FIFO clock signal corresponds to one entry, and one or more FIFO clock signals corresponding to one or more entries that are not configured according to the current depth are disabled.

14 Claims, 7 Drawing Sheets

METHODS FOR CONTROLLING ASYNCHRONOUS FIFO MEMORY AND DATA TRANSMISSION SYSTEM UTILIZING THE SAME

BACKGROUND OF THE INVENTION

1. Field of the Invention

The invention relates to a method for controlling asynchronous FIFO memory and the associated data transmission system to realize dynamic adjustment of the asynchronous FIFO depth.

2. Description of the Prior Art

Asynchronous First In First Out (FIFO) memory has been widely used in transmission across different clock domains. In order to solve the meta stability problem of the read and write pointers of the asynchronous FIFO when performing synchronization across different clock domains, the binary-coded read and write pointers are usually converted into Gray code encoded pointers before sampling. However, for such operation, the FIFO depth has to be limited to a power of 2, which greatly limits the application range of the FIFO and wastes circuit area, as well as increasing additional power consumption.

In view of this, a novel depth adjusting method is required. By modifying the method of determining the FIFO pointer, the FIFO depth becomes able to be flexibly set to any number based on the needs, without being limited to the power of 2, and the dynamic adjustment of the asynchronous FIFO depth can be realized.

SUMMARY OF THE INVENTION

It is an object of the invention to provide a method for controlling asynchronous FIFO memory to realize dynamic adjustment of its depth as well as dynamic adjustment of the clock signal for each entry, thereby effectively reducing power consumption on the basis of ensuring continuous data transmission.

According to an embodiment of the invention, a method for controlling operations of an asynchronous FIFO memory coupled between a master device and a slave device for buffering data written by the master device comprising: determining a current depth of the asynchronous FIFO memory according to at least one of a clock ratio, a burst length and a continuous transmission length, wherein the clock ratio is a ratio of a frequency of a first clock signal used by a master device to a frequency of a second clock signal used by a slave device; configuring one or more entries of the asynchronous FIFO memory to be used according to the current depth, wherein the asynchronous FIFO memory comprises a plurality of entries and the current depth is smaller than or equal to a total number of the entries; and controlling a plurality of FIFO clock signals provided to the asynchronous FIFO memory according to the current depth, wherein one FIFO clock signal corresponds to one entry, and one or more FIFO clock signals corresponding to one or more entries that are not configured according to the current depth are disabled.

According to another embodiment of the invention, a data transmission system comprises a master device and an asynchronous FIFO memory. The asynchronous FIFO memory is coupled between the master device and a slave device and comprises a plurality of entries for buffering data written by the master device. At least one of the master device and the asynchronous FIFO memory determines a current depth of the asynchronous FIFO memory according to at least one of a clock ratio, a burst length and a continuous transmission length. The current depth is smaller than or equal to a total number of the entries and the clock ratio is a ratio of a frequency of a first clock signal used by the master device to a frequency of a second clock signal used by the slave device. The asynchronous FIFO memory configures one or more entries to be used according to the current depth and controls a plurality of FIFO clock signals according to the current depth, wherein one FIFO clock signal corresponds to one entry, and one or more FIFO clock signals corresponding to one or more entries that are not configured according to the current depth are disabled.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
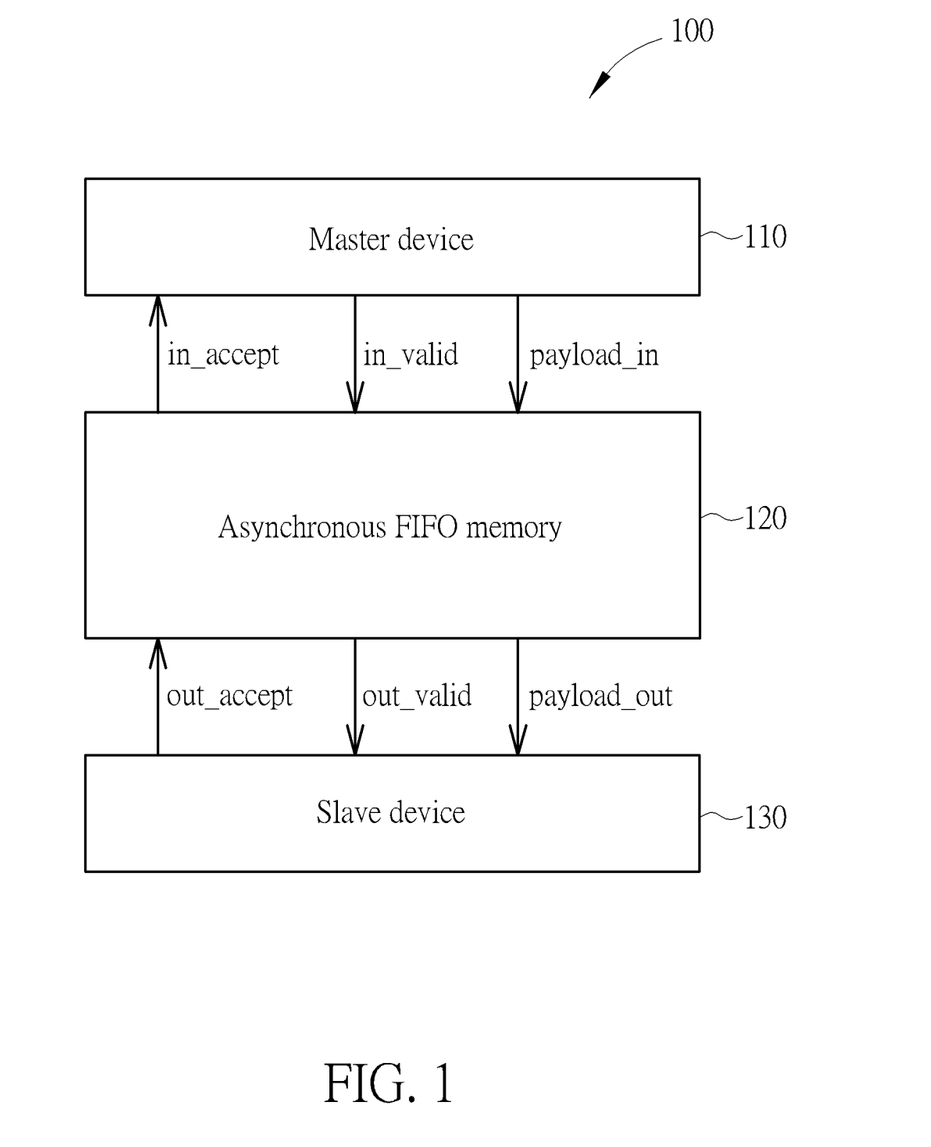
FIG. 1 is a schematic diagram illustrating a data transmission system according to an embodiment of the invention.

FIG. 1 is a schematic diagram illustrating a data transmission system according to an embodiment of the invention. The data transmission system 100 may comprise a master device 110, an asynchronous FIFO memory 120 and a slave device 130. The asynchronous FIFO memory 120 is coupled between the master device 110 and the slave device 130 for buffering data written by the master device 110. The slave device 130 is configured to read the data buffered in the asynchronous FIFO memory 120.

The asynchronous FIFO memory 120 comprises a plurality of entries. Each entry is a separately addressable storage location, that is, each being an entry corresponding to a storage space, and each entry may be accessed from the clock domain of the master device 110 and the clock domain of the slave device 130. The total number of entries comprised in the asynchronous FIFO memory 120 is the depth (or the maximum depth) of the asynchronous FIFO memory 120. As an example, the asynchronous FIFO memory 120 may comprise 8 entries, thus the asynchronous FIFO memory 120 may comprise 8 separately addressable storage locations for buffering data written by the master device 110.

When the master device 110 has to perform a write operation on the asynchronous FIFO memory 120, the master device 110 may push the data payload_in onto the transmission interface between the master device 110 and the asynchronous FIFO memory 120, as an example, a bus between the master device 110 and the asynchronous FIFO memory 120, and may sends a valid input data signal in_valid to the asynchronous FIFO memory 120. At this time, the valid input data signal in_valid may be set to a predetermined value, as an example, the value of the valid input data signal in_valid may be set to 1, so as to inform the asynchronous FIFO memory 120 that the data on the bus is valid data. If the asynchronous FIFO memory 120 is currently not full, it will reply an input accept signal in_accept to the master device 110 and capture the data payload_in from the bus, wherein the value of the input accept signal in_accept may be set to a predetermined value, as an example, the value of the input accept signal in_accept may be set to 1.

In addition, the asynchronous FIFO memory 120 may determine whether the FIFO status is currently empty. If it is determined that the FIFO is not empty, the data payload_out may be pushed to the transmission interface between the slave device 130 and the asynchronous FIFO memory 120, as an example, a bus between the slave device 130 and the asynchronous FIFO memory 120, and may sends a valid output data signal out_valid to the slave device 130. At this time, the valid output data signal out_valid may be set to a predetermined value, as an example, the value of the valid output data signal out_valid may be set to 1, so as to inform the slave device 130 that the data currently on the bus is valid data. When the slave device 130 has to perform a read operation on the asynchronous FIFO memory 120, it will reply an output accept signal out_accept to the asynchronous FIFO memory 120 and capture the data payload_out from the bus, wherein the value of the output accept signal out_accept may be set to a predetermined value, as an example, the value of the output accept signal out_accept may be set to 1.

Figure 2:
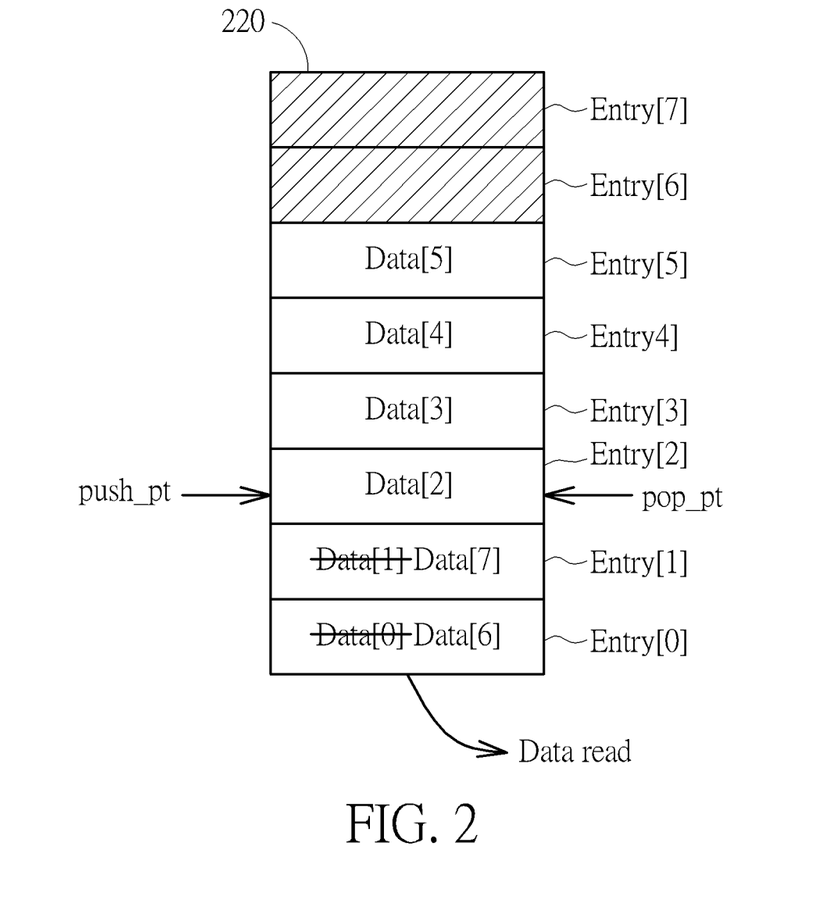
FIG. 2 is a schematic diagram illustrating an asynchronous FIFO memory with a depth of 8 according to an embodiment of the invention.

FIG. 2 is a schematic diagram illustrating an asynchronous FIFO memory with a depth of 8 according to an embodiment of the invention. The asynchronous FIFO memory 120/220 may use a write pointer push_pt to point to the next writable address and a read pointer pop_pt to point to the next read address. Every time when a piece of data is written, the asynchronous FIFO memory 120/220 will automatically increase the value of the write pointer push_pt by 1. Similarly, every time when a piece of data is read, the asynchronous FIFO memory 120/220 will automatically increase the value of the read pointer pop_pt by 1. In the example shown in FIG. 2, the total number of entries of the asynchronous FIFO memory 220 is 8, so that the depth is 8, but currently, only 6 entries (e.g. the entries Entry[0]-Entry[5]) are configured. Therefore, the currently un-configured entries Entry[6]-Entry[7] will not be written with data.

As shown in FIG. 2, assuming that the data Data[0]~Data[7] have been sequentially written into the asynchronous FIFO memory 220, since only 6 entries are currently configured, that is, the current depth is set to 6, after the data Data[0] is read, the data Data[6] will be written into the entry Entry[0] instead of the entry Entry[6]. Similarly, after the data Data[1] is read, the data Data[7] will be written into the entry Entry[1] instead of the entry Entry[7]. After the latest data Data[7] is written to the entry Entry[1], the write pointer push_pt will point to the entry Entry[2], and after the data Data[1] is read, the read pointer pop_pt will point to the entry Entry[2]. In the example of FIG. 2, the current FIFO status of the asynchronous FIFO memory 220 is full.

According to an embodiment of the invention, at least one of the master device 110 and the asynchronous FIFO memory 120/220 may dynamically determine a current depth of the asynchronous FIFO memory 120/220 according to at least one of a clock ratio, a burst length and a continuous transmission length. The clock ratio is a ratio of a frequency of a first clock signal used by the master device 110 to a frequency of a second clock signal used by the slave device 130. For example, the clock ratio of the master device 110 to the slave device 130 may be 4:1, 3:1, 2:1, 1:1, 1:2, 1:3, 1:4, and so on. The burst length may be the length of data transmitted by the master device 110 in response to a write command after the master device 110 issued the write command. Suppose that the master device 110 sets the burst length to 4 and the width of each piece of data is 8 bits, after the master device 110 issues a write command, the master device 110 may consecutively transmit 4 pieces of 8-bit data in response to the write command. The continuous transmission length may also be referred to as a back-to-back length, and the continuous transmission length is the number of write commands that the master device 110 can issue one after another or issue in succession. Generally, the continuous transmission length may be predicted or calculated based on the capabilities of the master device 110. Assuming that the master device 110 has a high data transmission speed or has outstanding capability, it can be predicted that the continuous transmission length may be greater than a threshold value. Alternatively, the continuous transmission length of the master device 110 may be obtained through statistics over a period of time. Note that the aforementioned outstanding capability refers to the capability for the master device 110 to immediately issue a next command before the data transmission is actually completed.

As described above, the master device 110 or the asynchronous FIFO memory 120/220 may dynamically determine the current depth of the asynchronous FIFO memory 120/220 according to at least one of a clock ratio, a burst length and a continuous transmission length, wherein the current depth is smaller than or equal to the total number of entries comprised in the asynchronous FIFO memory 120/220. According to an embodiment of the invention, if the master device 110 or the asynchronous FIFO memory 120/220 determines that the difference between the frequency of the first clock signal and the frequency of the second clock signal is relatively larger according to the clock ratio, the master device 110 or the asynchronous FIFO memory 120/220 may select a smaller value as the current depth. Therefore, the greater a difference (e.g. the frequency difference between the first clock signal and the second clock signal) is indicated by the clock ratio, the smaller current depth is determined. According to another embodiment of the invention, if the master device 110 or the asynchronous FIFO memory 120/220 determines that the burst length is long, the master device 110 or the asynchronous FIFO memory 120/220 may select a larger value as the current depth. Therefore, the longer the burst length is set, the greater current depth is determined. According to yet another embodiment of the invention, if the master device 110 or the asynchronous FIFO memory 120/220 determines that the continuous transmission length is long, the master device 110 or the asynchronous FIFO memory 120/220 may select a larger value as the current depth. Therefore, the longer the continuous transmission length, the greater the current depth is determined.

According to an embodiment of the invention, the master device 110 or the asynchronous FIFO memory 120/220 may store or have a build-in comparison table, and the comparison table may record the respective mapping relationship between the depth of the asynchronous FIFO memory and parameters such as the clock ratio, the burst length, the continuous transmission length, or the like, and the master device 110 or the asynchronous FIFO memory 120/220 may refer to this comparison table to dynamically determine the current depth according to at least one of the clock ratio, the burst length and the continuous transmission length.

Figure 3:
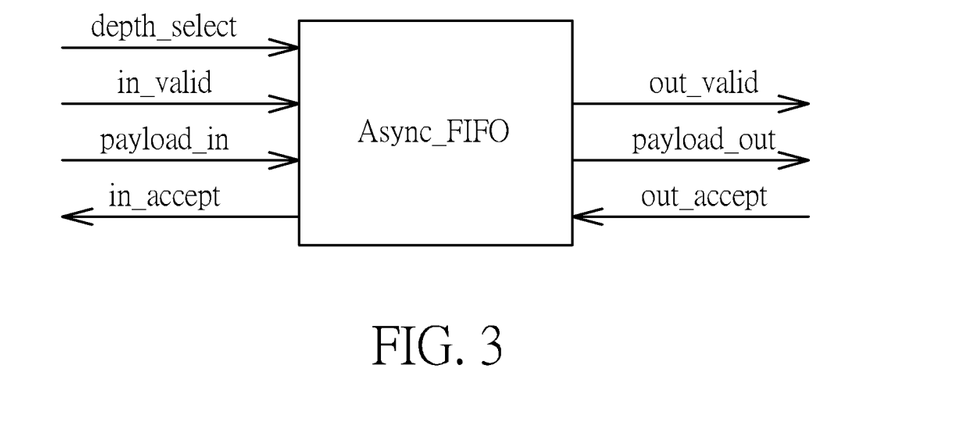
FIG. 3 is a schematic diagram illustrating an asynchronous FIFO memory according to an embodiment of the invention.

FIG. 3 is a schematic diagram illustrating an asynchronous FIFO memory according to an embodiment of the invention. Besides the aforementioned valid input data signal in_valid, input accept signal in_accept, valid output data signal out_valid, output accept signal out_accept, and input data payload_in and output data payload_out, the asynchronous FIFO memory Async_FIFO may further receive a depth selection signal depth_select. In an embodiment of the invention, the depth selection signal depth_select may be a signal sent by the master device and carry information regarding the clock ratio, the burst length and/or the continuous transmission length. The asynchronous FIFO memory Async_FIFO may dynamically determine the current depth according to at least one of the clock ratio, the burst length and the continuous transmission length. In another embodiment of the invention, the master device may dynamically determine the current depth of the asynchronous FIFO memory Async_FIFO according to at least one of the clock ratio, the burst length and the continuous transmission length, and provide this information to the asynchronous FIFO memory Async_FIFO via the depth selection signal depth_select.

After the current depth is determined or the information regarding the current depth is obtained, the asynchronous FIFO memory may configure the number of entries to be used according to the current depth, and correspondingly control a plurality of FIFO clock signals according to the current depth. One FIFO clock signal corresponds to one entry of the asynchronous FIFO memory. In the embodiments of the invention, one or more FIFO clock signals corresponding to one or more entries that are not configured according to the current depth may be disabled, thereby effectively reducing the power consumption of the asynchronous FIFO memory.

It is noted that FIG. 3 shows a simplified schematic diagram of the asynchronous FIFO memory, in which only part of the input/output signals of the asynchronous FIFO memory are shown. Those skilled in the art will understand that the asynchronous FIFO memory may further comprise other input/output signals not shown in FIG. 3.

Figure 4:
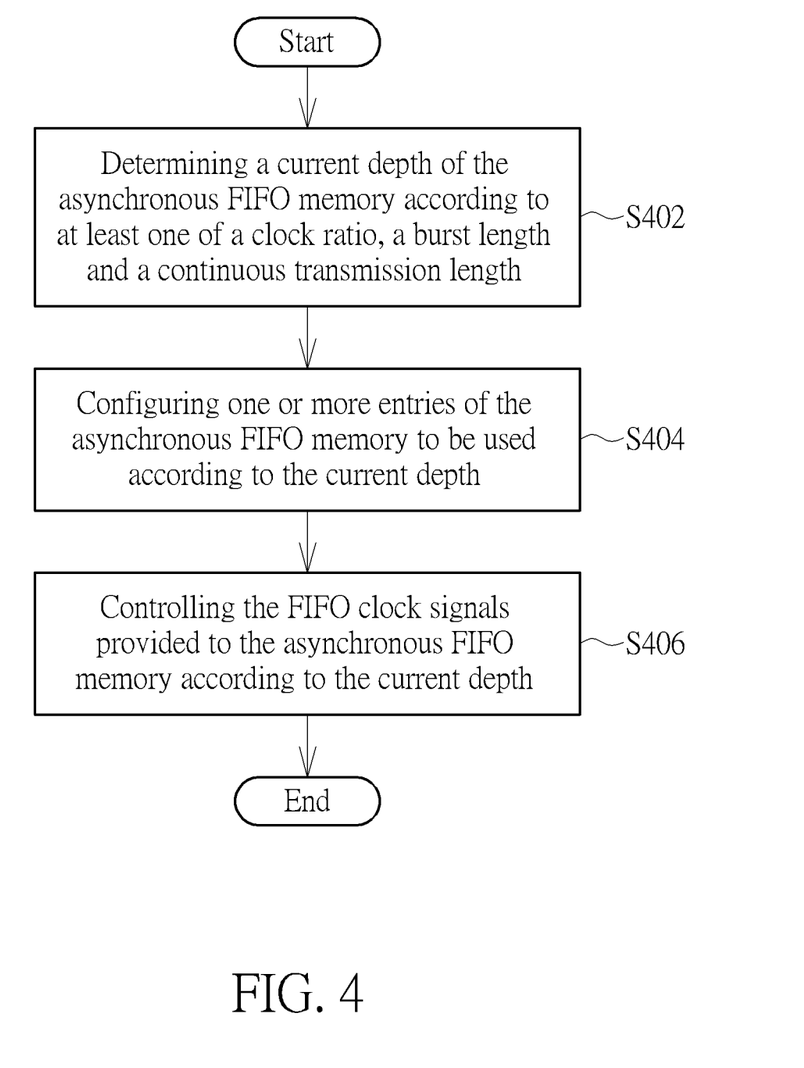
FIG. 4 is a flow chart of a method for controlling operations of an asynchronous FIFO memory according to an embodiment of the invention.

FIG. 4 is a flow chart of a method for controlling operations of an asynchronous FIFO memory according to an embodiment of the invention. The proposed method for controlling operations of an asynchronous FIFO memory comprises the following steps:

Step S402: a current depth of the asynchronous FIFO memory is determined according to at least one of a clock ratio, a burst length and a continuous transmission length.

Step S404: one or more entries of the asynchronous FIFO memory is configured to be used according to the current depth.

Step S406: the FIFO clock signals provided to the asynchronous FIFO memory is controlled according to the current depth.

In the embodiments of the invention, the selection of the current depth need not be limited to a power of 2 as in the prior art. That is, in step S402, the current depth may be set to any positive integer between 2 and N, where N is the maximum depth of the asynchronous FIFO memory.

According to an embodiment of the invention, the read pointer pop_pt and the write pointer push_pt of the asynchronous FIFO memory may be represented by a plurality of bits, wherein the bit width of the read pointer pop_pt and the write pointer push_pt may be set to number of bits that is required to represent the maximum depth of the asynchronous FIFO memory. For determining the current empty/full status of the FIFO, in the embodiments of the invention, an auxiliary bit is added to the read pointer pop_pt and the write pointer push_pt, to respectively become an auxiliary read pointer pop_pt_p and auxiliary write pointer push_pt_p. To be more specific, suppose that the depth or the maximum depth of the asynchronous FIFO memory is 8, the bit width required to represent the maximum depth of the asynchronous FIFO memory is 3 since 3 bits is required when representing the value of 8 in binary. In the embodiments of the invention, on the basis of the bit width required to represent the maximum depth of the asynchronous FIFO memory, the bit width of the read pointer pop_pt and the write pointer push_pt of the asynchronous FIFO memory may be set to 3.

In addition, in the embodiments of the invention, based on the bit width required to represent the maximum depth of the asynchronous FIFO memory, one additional bit may be utilized to widen read pointer and the write pointer to respectively become the auxiliary read pointer pop_pt_p and the auxiliary write pointer push_pt_p. That is, when 3 bits is required to represent the maximum depth of the asynchronous FIFO memory, the bit width of the auxiliary read pointer pop_pt_p and the auxiliary write pointer push_pt_p may be set to (3+1)=4. With such settings, even if the current depth is set to a value other than a power of 2, the auxiliary read pointer pop_pt_p and the auxiliary write pointer push_pt_p may be used to effectively determine the current FIFO empty/full status.

As described above, the asynchronous FIFO memory updates the write pointer push_pt in response to a write operation of the master device, and updates the read pointer pop_pt in response to a read operation of the slave device. The updates of the read pointer pop_pt and the write pointer push_pt will be introduced in the following paragraphs.

Figure 5:
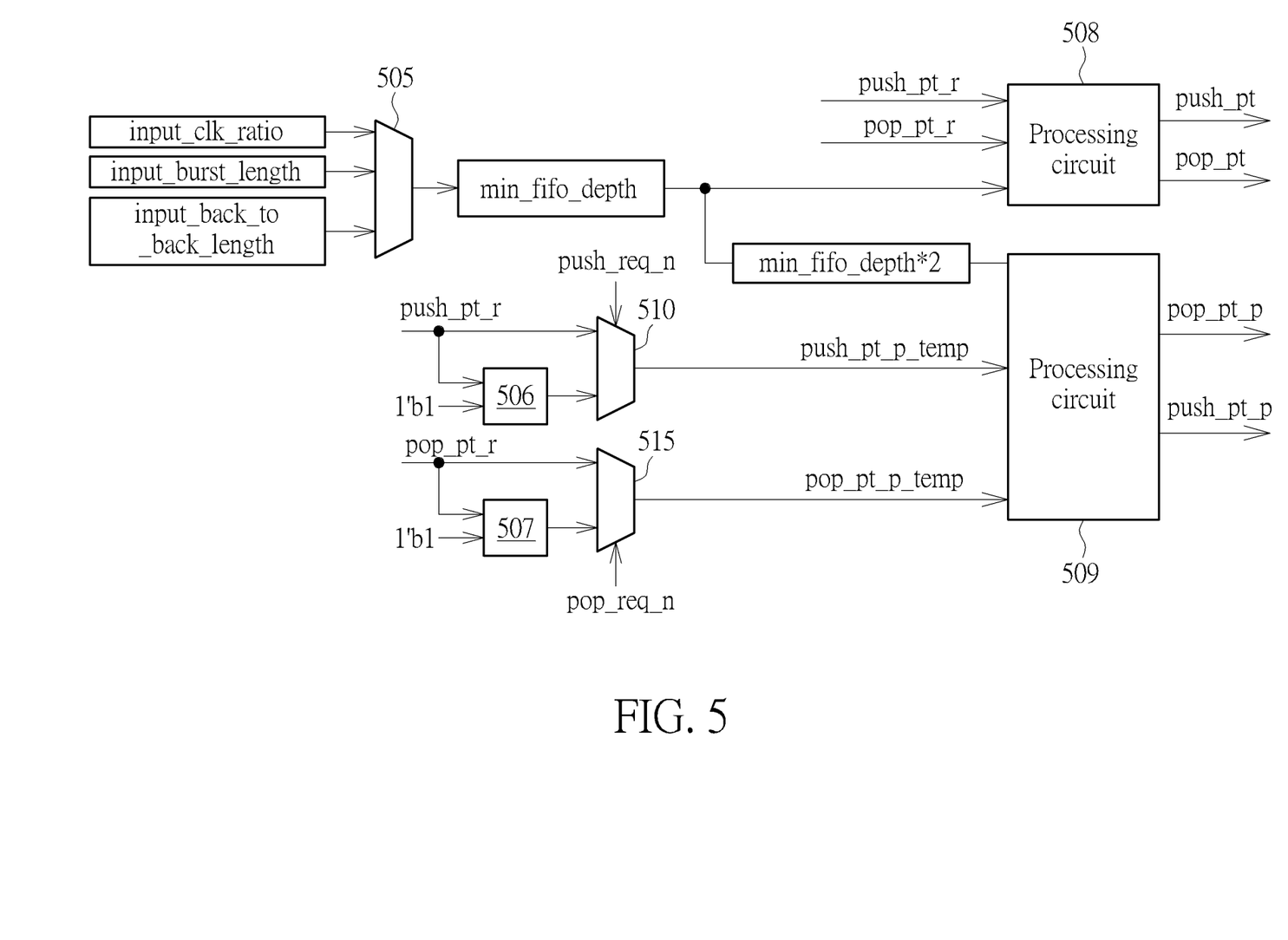
FIG. 5 is a schematic diagram illustrating a portion of the logic circuits configured inside the asynchronous FIFO memory according to an embodiment of the invention.

FIG. 5 is a schematic diagram illustrating a portion of the logic circuits configured inside the asynchronous FIFO memory according to an embodiment of the invention, for describing the operations of updating the write pointer push_pt and the read pointer pop_pt. In this embodiment, the setting values of the clock ratio input_clk_ratio, the burst length input_burst_length and the continuous transmission length input_back_to_back_length may be provided to the input of the multiplexer 505. The multiplexer 505 may output one of them as a reference for determining the current depth of the asynchronous FIFO memory. For example, the multiplexer 505 may output the one that has been changed (i.e., having a value that is different from the previously setting value) among the three current setting values as a reference for determining the current depth of the asynchronous FIFO memory. In this embodiment, the determined current depth may be regarded as the minimum depth min_fifo_depth of the asynchronous FIFO memory.

Besides the aforementioned auxiliary write pointer push_pt_p and auxiliary read pointer pop_pt_p, another auxiliary write pointer push_pt_r and another auxiliary read pointer pop_pt_r are also generated inside the asynchronous FIFO memory.

The adder 506 may add the bit value of said another auxiliary write pointer push_pt_r by 1 (marked as 1'b1) and then output said another auxiliary write pointer push_pt_r, and the adder 507 may add said another auxiliary read pointer pop_pt_r by 1 (marked as 1'b1) and then output said another auxiliary read pointer pop_pt_r, wherein said another auxiliary write pointer push_pt_r is a delayed version of the aforementioned auxiliary write pointer push_pt_p, and the changes of these two pointers will differ by one clock cycle. That is, when the value of the write pointer changes, the value of the aforementioned auxiliary write pointer push_pt_p will change first, and then the value of said another auxiliary write pointer push_pt_r will be changed in the next clock cycle. Similarly, said another auxiliary read pointer pop_pt_r is a delayed version of the aforementioned auxiliary read pointer pop_pt_p, and the changes of these two pointers will differ by one clock cycle. When the value of the read pointer changes, the value of the aforementioned auxiliary read pointer pop_pt_p will change first, and the value of said another auxiliary read pointer pop_pt_r will be changed in the next clock cycle.

When data is written into the asynchronous FIFO memory, the selection signal push_req_n will be set to another predetermined value. For example, the value of push_req_n may be set to 0. At this time, the multiplexer 510 selects said another auxiliary write pointer push_pt_r whose bit value has been increased by 1 to be output as a temporary write pointer push_pt_p_temp. The selection signal push_req_n is an inverted result of the logical AND (AND) operation of the input accept signal in_accept and the valid input data signal invalid, that is, push_req_n=! (in_accept & in_valid). On the other hand, when the selection signal push_req_n is not set to said another predetermined value, the multiplexer 510 selects said another auxiliary write pointer push_pt_r whose bit value is not increased by 1 to be output as the temporary write pointer push_pt_p_temp.

Similarly, when the data is read, the selection signal pop_req_n will be set to another predetermined value, for example, the value of pop_req_n may be set to 0. At this time, the multiplexer 515 selects said another auxiliary read pointer pop_pt_r whose bit value has been increased by 1 to be output as a temporary read pointer pop_pt_p_temp. The selection signal pop_req_n is an inverted result of the logical AND operation of the output accept signal out_accept and the valid output data signal out_valid, that is, pop_req_n=! (out_accept & out_valid). On the other hand, when the selection signal pop_req_n is not set to said another predetermined value, the multiplexer 515 selects said another auxiliary read pointer pop_pt_r whose bit value is not increased by 1 to be output as the temporary read pointer pop_pt_p_temp.

The processing circuit 509 receives the temporary write pointer push_pt_p_temp, the temporary read pointer pop_pt_p_temp and the value of twice the minimum depth min_fifo_depth (marked as min_fifo_depth*2), and respectively compares the values of the temporary write pointer push_pt_p_temp and the temporary read pointer pop_pt_p_temp with the value of twice the minimum depth. If the current value of the temporary write pointer push_pt_p_temp is equal to the value of twice the minimum depth min_fifo_depth, the processing circuit 509 resets the auxiliary write pointer push_pt_p to 0 and then outputs it. If the current value of the temporary write pointer push_pt_p_temp is not equal to the value of twice the minimum depth min_fifo_depth, the processing circuit 509 outputs the temporary write pointer push_pt_p_temp as the auxiliary write pointer push_pt_p.

Similarly, if the current value of the temporary read pointer pop_pt_p_temp is equal to the value of twice the minimum depth min_fifo_depth, the processing circuit 509 resets the auxiliary read pointer pop_pt_p to 0 and then outputs it. If the current value of the temporary read pointer pop_pt_p_temp is not equal to the value of twice the minimum depth min_fifo_depth, the processing circuit 509 outputs the temporary read pointer pop_pt_p_temp as the auxiliary read pointer pop_pt_p.

If the value of the auxiliary write pointer push_pt_p/the auxiliary read pointer pop_pt_p changes, the value of said another auxiliary write pointer push_pt_r/another auxiliary read pointer pop_pt_r will be changed accordingly in the next clock cycle. The processing circuit 508 receives said another auxiliary write pointer push_pt_r, said another auxiliary read pointer pop_pt_r and the value of minimum depth min_fifo_depth, and respectively compares the values of said another auxiliary write pointer push_pt_r and said another auxiliary read pointer pop_pt_r with the currently set minimum depth min_fifo_depth. If the current value of said another auxiliary write pointer push_pt_r is smaller than the value of the minimum depth min_fifo_depth, the processing circuit 508 discards the Most Significant Bit (MSB) of said another auxiliary write pointer push_pt_r and outputs the remaining bits as the write pointer push_pt. If the current value of said another auxiliary write pointer push_pt_r is not smaller than the value of the minimum depth min_fifo_depth, the processing circuit 509 subtracts the value of the minimum depth min_fifo_depth from the current value of said another auxiliary write pointer push_pt_r, discards the most significant bit of the subtraction result, and then outputs the remaining bits as the write pointer push_pt.

Similarly, if the current value of said another auxiliary read pointer pop_pt_r is smaller than the value of the minimum depth min_fifo_depth, the processing circuit 508 discards the most significant bit of said another auxiliary read pointer pop_pt_r and outputs the remaining bits as the read pointer pop_pt. If the current value of the auxiliary read pointer pop_pt_r is not smaller than the value of the minimum depth min_fifo_depth, the processing circuit 508 subtracts the value of the minimum depth min_fifo_depth from the current value of said another auxiliary read pointer pop_pt_r, discards the most significant bit of the subtraction result, and then outputs the remaining bits as the read pointer pop_pt.

Figure 6:
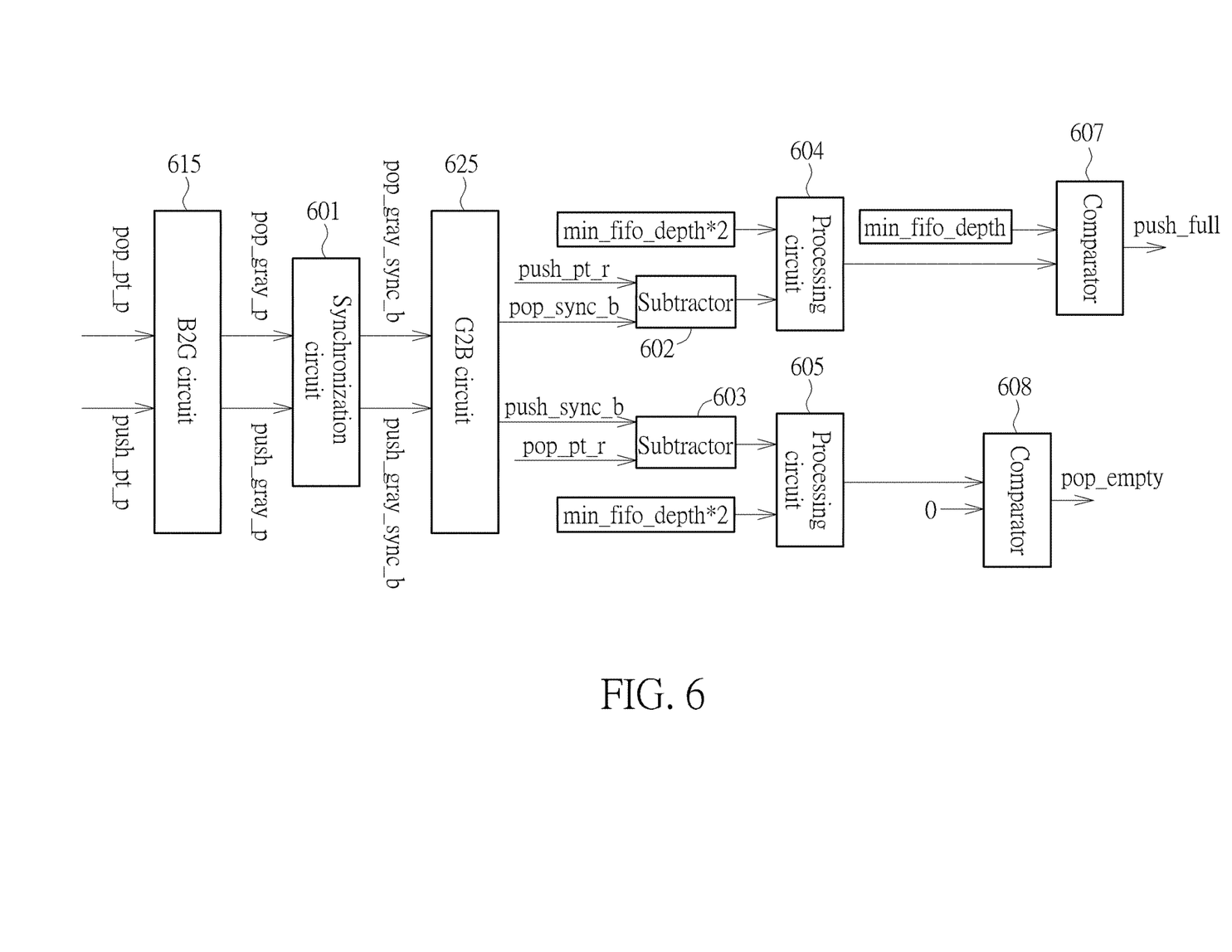
FIG. 6 is a schematic diagram illustrating another portion of the logic circuit inside the asynchronous FIFO memory according to an embodiment of the invention.

FIG. 6 is a schematic diagram illustrating another portion of the logic circuit inside the asynchronous FIFO memory according to an embodiment of the invention, for describing the operation of using the auxiliary read pointer pop_pt_p and the auxiliary write pointer push_pt_p to effectively determine the current FIFO empty/full status. The Binary code-to-Gray code circuit (labeled as B2G circuit) 615 converts the binary-coded auxiliary read pointer pop_pt_p into a Gray-coded auxiliary read pointer pop_gray_p, and converts the binary-coded auxiliary write pointer push_pt_p into a Gray-coded auxiliary write pointer push_gray_p. The synchronization circuit 601 is configured to resample the Gray-coded auxiliary read pointer pop_gray_p based on the clock of the write pointer signal to generate the Gray-coded synchronized read pointer pop_gray_sync_b, and to resample the Gray-coded auxiliary write pointer push_gray_b based on the clock of the read pointer signal to generate the Gray-coded synchronized write pointer push_gray_sync_b.

The Gray code-to-Binary code circuit (labeled as G2B circuit) 625 converts the resampled read/write pointer from the Gray code encoded format to the binary code encoded format to generate a synchronized read pointer pop_sync_b and a synchronized write pointer push_sync_b.

After this operation, the synchronized read pointer pop_sync_b and said another auxiliary write pointer push_pt_r are in the same clock domain, and the synchronized write pointer push_sync_b and said another auxiliary read pointer pop_pt_r are in the same clock domain. The subtractor 602 subtracts the value of the synchronized read pointer pop_sync_b from the value of said another auxiliary write pointer push_pt_r and outputs the subtraction result. The subtractor 603 subtracts the value of said another auxiliary read pointer pop_pt_r from the value of the synchronized write pointer push_sync_b and outputs the subtraction result.

The processing circuit 604 receives the output of the subtractor 602 and the value of twice the minimum depth min_fifo_depth, and takes an absolute value of the output of the subtractor 602. For example, if the result obtained by subtracting the value of the synchronized read pointer pop_sync_b from the value of said another auxiliary write pointer push_pt_r is a positive integer, the processing circuit 604 directly outputs the obtained result. If the result obtained by subtracting the value of the synchronized read pointer pop_sync_b from the value of said another auxiliary write pointer push_pt_r is a negative integer, the processing circuit 604 takes the absolute value of the obtained result and outputs it. For example, the processing circuit 604 may output the value of twice the minimum depth min_fifo_depth minus the difference between the synchronized read pointer pop_sync_b and said another auxiliary write pointer push_pt_r.

Similarly, the processing circuit 605 receives the output of the subtractor 603 and the value of twice the minimum depth min_fifo_depth, and takes an absolute value of the output of the subtractor 603. For example, if the result obtained by subtracting the value of said another auxiliary read pointer pop_pt_r from the value of the synchronized write pointer push_sync_b is a positive integer, the processing circuit 605 directly outputs the obtained result. If the result obtained by subtracting the value of said another auxiliary read pointer pop_pt_r from the value of the synchronized write pointer push_sync_b is a negative integer, the processing circuit 605 takes the absolute value of the obtained result and outputs it. For example, the processing circuit 605 may output the value of twice the minimum depth min_fifo_depth minus the difference between said another auxiliary read pointer pop_pt_r and the synchronized write pointer push_sync_b.

The comparator 607 may receive the value of the minimum depth min_fifo_depth and the output of the processing circuit 604 and compares them to generate the full flag push_full. If the output of the processing circuit 604 is equal to the value of the minimum depth min_fifo_depth, the full flag push_full is set to a predetermined value (e.g., the full flag push_full may be set to 1). If the output of the processing circuit 604 is not equal to the value of the minimum depth min_fifo_depth, the full flag push_full is not set to the predetermined value (e.g., the full flag push_full may be set to 0).

The comparator 608 may receive and compare the value 0 with the output of processing circuit 605 to generate an empty flag pop_empty. If the output of the processing circuit 605 is equal to the value 0, the empty flag pop_empty is set to a predetermined value (e.g., the empty flag pop_empty may be set to 1). If the output of the processing circuit 605 is not equal to the value 0, the empty flag pop_empty is not set to a predetermined value (e.g., the empty flag pop_empty may be set to 0).

Therefore, according to an embodiment of the invention, when the absolute value of a difference between a value corresponding to a write pointer (e.g., said another auxiliary write pointer push_pt_r) and a value corresponding to a read pointer (e.g., the synchronized read pointer pop_sync_b) is equal to the current depth, the asynchronous FIFO memory may set the full flag push_full to said predetermined value, and when a difference between the value of the write pointer (e.g., the synchronized write pointer push_sync_b) and the value of the read pointer (e.g., said another auxiliary read pointer pop_pt_r) is 0, the asynchronous FIFO memory may set the empty flag pop_empty to said predetermined value.

In the embodiment of the invention, the logic circuit shown in FIG. 6 is applicable to various setting values of the current depth. That is, regardless of whether the current depth (which is also referred to as the minimum depth min_fifo_depth of the asynchronous FIFO memory) is set to a power of 2, the logic circuit shown in FIG. 6 is capable of generating correct full flag push_full and correct empty flag pop_empty.

According to another embodiment of the invention, when the current depth is set to a power of 2, since an auxiliary bit is added to the read pointer pop_pt and the write pointer push_pt to becomes the auxiliary read pointer pop_pt_p/pop_pt_r and the auxiliary write pointer push_pt_p/push_pt_r, the logic circuit for generating the full flag push_full and the empty flag pop_empty may be further simplified.

Figure 8:
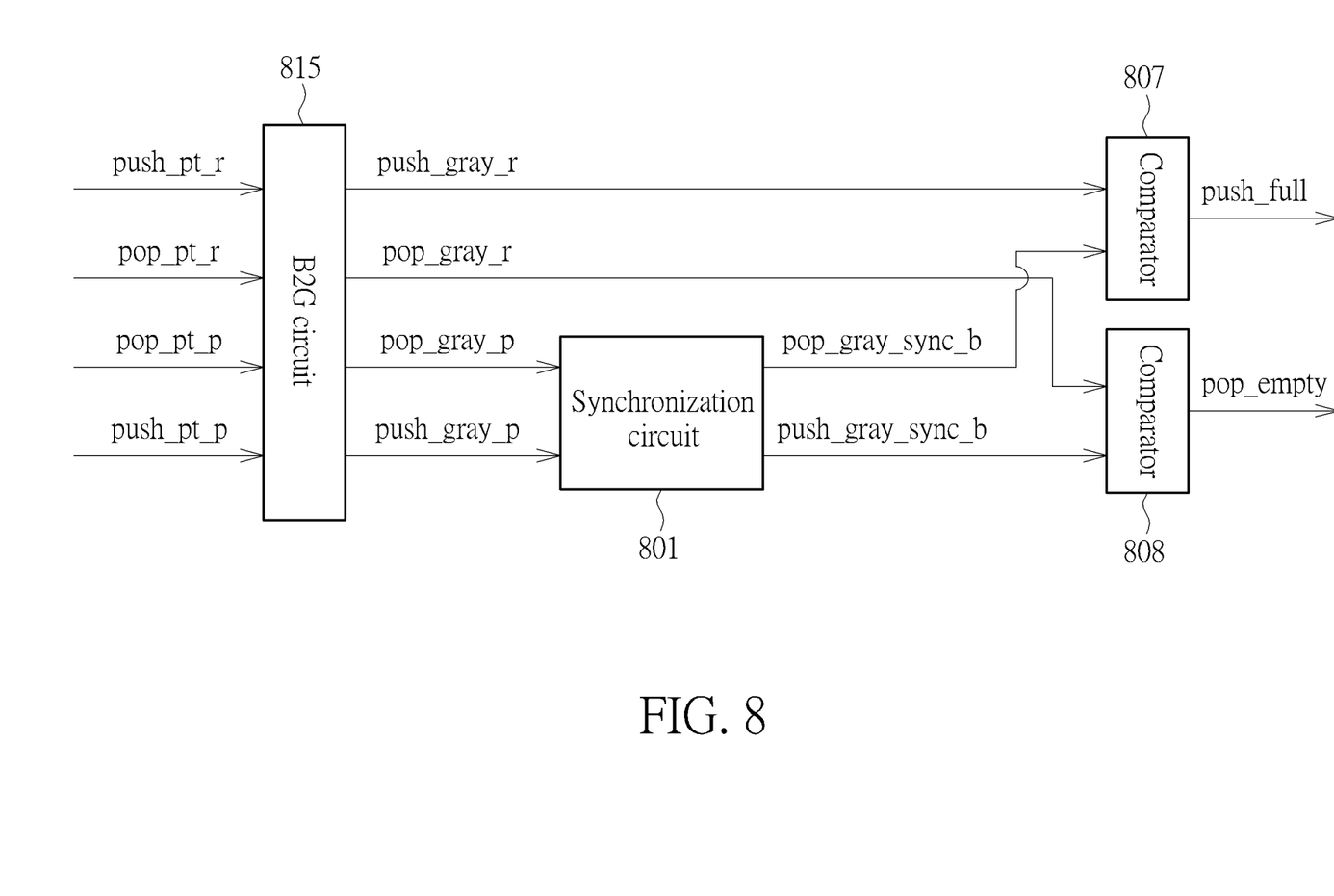
FIG. 8 is a schematic diagram illustrating another part of the logic circuit inside the asynchronous FIFO memory according to an embodiment of the invention.

FIG. 8 is a schematic diagram illustrating another part of the logic circuit inside the asynchronous FIFO memory according to an embodiment of the invention, for describing the operation of using the auxiliary read pointers pop_pt_r and pop_pt_p and the auxiliary write pointers push_pt_r and push_pt_p to effectively determine the current FIFO empty/full status when the current depth is set to a power of 2. The Binary code-to-Gray code circuit (labeled as B2G circuit) 815 respectively converts the binary-coded auxiliary read pointers pop_pt_r and pop_pt_p into Gray-coded auxiliary read pointers pop_gray_r and pop_gray_p, and converts the binary-coded auxiliary write pointers push_pt_r and push_pt_p into Gray-coded auxiliary write pointers push_gray_r and push_gray_p. The synchronization circuit 801 is configured to resample the Gray-coded auxiliary read pointer pop_gray_p based on the clock of the write pointer signal to generate the Gray-coded synchronized read pointer pop_gray_sync_b, and resample the Gray-coded auxiliary write pointer push_gray_p based on the clock of the read pointer signal to generate Gray-coded synchronized write pointer push_gray_sync_b.

The comparator 807 receives and compares the Gray-coded auxiliary write pointer push_gray_r with the Gray-coded synchronized read pointer pop_gray_sync_b. When, except for the most significant bit and a bit next to the most significant bit (i.e., the second most significant bit), the rest of the bits of the Gray-coded auxiliary write pointer push_gray_r and the Gray-coded synchronized read pointer pop_gray_sync_b are the same (i.e., when the Gray-coded auxiliary write pointer push_gray_r and the Gray-coded synchronized read pointer pop_gray_sync_b have the same bits except for the most significant bit and the second most significant bit), the asynchronous FIFO memory sets the full flag to said predetermined value (e.g., the full flag push_full may be set to 1). On the other hand, when the rest of the bits of the Gray-coded auxiliary write pointer push_gray_r and the Gray-coded synchronized read pointer pop_gray_sync_b are not the same, the full flag is not to the predetermined value (e.g., the full flag push_full may be set to 0).

The comparator 808 receives and compares the Gray-coded auxiliary read pointer pop_gray_r with the Gray-coded synchronized write pointer push_gray_sync_b. When all bits of the Gray-coded auxiliary read pointer pop_gray_r and the Gray-coded synchronized write pointer push_gray_sync_b are the same (i.e., when the Gray-coded synchronized write pointer push_gray_sync_b and the Gray-coded auxiliary read pointer pop_gray_r have the same bits), the asynchronous FIFO memory sets the empty flag to said predetermined value (e.g., the empty flag pop_empty may be set to 1). When not all bits of the Gray-coded auxiliary read pointer pop_gray_r and the Gray-coded synchronized write pointer push_gray_sync_b are the same, the empty flag is not to the predetermined value (e.g., the empty flag pop_empty may be set to 0).

Besides the abovementioned determination of the current FIFO empty/full status, in the embodiments of the invention, one or more FIFO clock signals corresponding to one or more entries that are not configured according to the current depth may be disabled, Thereby, the power consumption of the asynchronous FIFO memory may be effectively reduced. Taking an asynchronous FIFO memory with a maximum depth of 8 as an example, assuming that the current depth is set to 6, at least 7 independent Isolation Clock Gating (ICG) circuits may be used to control the FIFO clock signals. Among them, one ICG circuit is configured to close the FIFO clock signals corresponding to the two un-configured entries, and the remaining six ICG circuits are configured to control the FIFO clock signals corresponding to the six configured entries.

Figure 7:
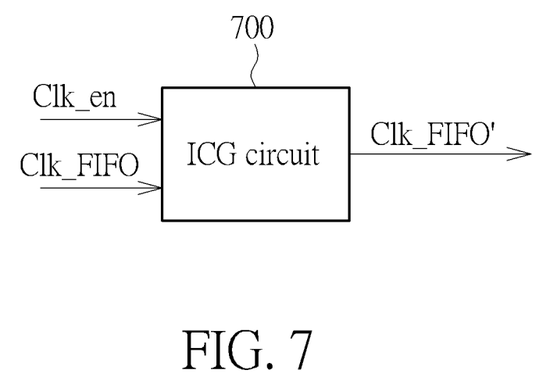
FIG. 7 is a schematic diagram illustrating an isolated clock gating circuit according to an embodiment of the invention.

FIG. 7 is a schematic diagram illustrating an isolated clock gating circuit according to an embodiment of the invention. It is assumed that the ICG circuit 700 is the ICG circuit corresponding to the first FIFO entry.

The ICG circuit 700 may receive the clock enable signal Clk_en and the FIFO clock signal Clk_FIFO, and enable or disable the FIFO clock signal Clk_FIFO according to the clock enable signal Clk_en, thereby generating a controlled FIFO clock signal Clk_FIFO'. When a first piece of data is pushed to the transmission interface between the master device and the asynchronous FIFO memory, the valid input data signal in_valid is set to a predetermined value and at this time, the write pointer push_pt points to the first FIFO entry. The asynchronous FIFO memory may generate the clock enable signal Clk_en according to the write pointer push_pt and the valid input data signal in_valid. For example, the write pointer push_pt and the valid input data signal in_valid are provided to the inputs of an AND logic gate to generate the clock enable signal Clk_en and at this time, the clock enable signal Clk_en is set to a predetermined value (e.g., the clock enable signal Clk_en will be set to 1). The clock enable signal Clk_en will be provided to the ICG circuit 700 to enable the FIFO clock signal Clk_FIFO corresponding to the first FIFO entry, thereby enabling the controlled FIFO clock signal Clk_FIFO', while other FIFO clock signals corresponding to the remaining FIFO entry are disabled. In response to the enabled FIFO clock signal Clk_FIFO', the data payload_in will be stored into the first FIFO entry pointed to by the write pointer push_pt. After the data is written into the first FIFO entry, the clock enable signal Clk_en is changed to another value different from the predetermined value (e.g., the clock enable signal Clk_en is set to 0) so as to disable the FIFO clock signal Clk_FIFO corresponding to the first FIFO entry. Therefore, the controlled FIFO clock signal Clk_FIFO' is disabled.

Similarly, when the second pieces of data is pushed to the transmission interface between the master device and the asynchronous FIFO memory, since the write pointer push_pt points to the second FIFO entry, the ICG circuit corresponding to the second FIFO entry may activate (e.g. enable) the FIFO clock signal corresponding to the second FIFO entry, and in response to this, the data payload_in will be stored into the second FIFO entry pointed to by the write pointer push_pt. At this time, the FIFO clock signals corresponding to other FIFO entries are disabled. The rest of the operations may be deduced by the analogous. Through the abovementioned operations of the independent ICG circuits, the power consumption of the asynchronous FIFO memory is effectively reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling operations of an asynchronous FIFO memory, wherein the asynchronous FIFO memory is coupled between a master device and a slave device for buffering data written by the master device, the method comprising:
   determining a current depth of the asynchronous FIFO memory according to at least one of a clock ratio, a burst length and a continuous transmission length, wherein the clock ratio is a ratio of a frequency of a first clock signal used by the master device to a frequency of a second clock signal used by the slave device;
   configuring one or more entries of the asynchronous FIFO memory to be used according to the current depth, wherein the asynchronous FIFO memory comprises a plurality of entries and the current depth is smaller than or equal to a total number of the entries; and
   controlling a plurality of FIFO clock signals provided to the asynchronous FIFO memory according to the current depth, wherein one FIFO clock signal corresponds to one entry, and one or more FIFO clock signals corresponding to one or more entries that are not configured according to the current depth are disabled.

2. The method for controlling operations of the asynchronous FIFO memory of claim 1, wherein greater a difference between the frequency of the first clock signal and the frequency of the second clock signal, smaller the current depth of the asynchronous FIFO memory.

3. The method for controlling operations of the asynchronous FIFO memory of claim 1, wherein longer the burst length, the greater the current depth.

4. The method for controlling operations of the asynchronous FIFO memory of claim 1, wherein longer the continuous transmission length, the greater the current depth.

5. The method for controlling operations of the asynchronous FIFO memory of claim 1, further comprising:
   updating a write pointer in response to a write operation of the master device, wherein the write pointer is represented by a plurality of bits;
   updating a read pointer in response to a read operation of the slave device, wherein the read pointer is represented by a plurality of bits; and
   generating a full flag according to the write pointer and the read pointer, wherein when the write pointer and the read pointer have same bits except for a most significant bit and a second most significant bit, the full flag is set to a predetermined value.

6. The method for controlling operations of the asynchronous FIFO memory of claim 1, further comprising:
updating a write pointer in response to a write operation of the master device, wherein the write pointer is represented by a plurality of bits;
updating a read pointer in response to a read operation of the slave device, wherein the read pointer is represented by a plurality of bits; and
generating an empty flag according to the write pointer and the read pointer,
wherein when the write pointer and the read pointer have same bits, the empty flag is set to a predetermined value.

7. The method for controlling operations of the asynchronous FIFO memory of claim 1, further comprising:
updating a write pointer in response to a write operation of the master device;
updating a read pointer in response to a read operation of the slave device; and
generating a full flag according to the current depth, the write pointer and the read pointer,
wherein when an absolute value of a difference between a value corresponding to the write pointer and a value corresponding to the read pointer is equal to the current depth, the full flag is set to a predetermined value.

8. A data transmission system, comprising:
a master device; and
an asynchronous FIFO memory, coupled between the master device and a slave device and comprising a plurality of entries for buffering data written by the master device,
wherein at least one of the master device and the asynchronous FIFO memory determines a current depth of the asynchronous FIFO memory according to at least one of a clock ratio, a burst length and a continuous transmission length, wherein the current depth is smaller than or equal to a total number of the entries and the clock ratio is a ratio of a frequency of a first clock signal a used by the master device to a frequency of a second clock signal used by the slave device, and
the asynchronous FIFO memory configures one or more entries to be used according to the current depth and controls a plurality of FIFO clock signals according to the current depth, wherein one FIFO clock signal corresponds to one entry, and one or more FIFO clock signals corresponding to one or more entries that are not configured according to the current depth are disabled.

9. The data transmission system of claim 8, wherein greater a difference between the frequency of the first clock signal and the frequency of the second clock signal, smaller the current depth of the asynchronous FIFO memory.

10. The data transmission system of claim 8, wherein longer the burst length, the greater the current depth.

11. The data transmission system of claim 8, wherein longer the continuous transmission length, the greater the current depth.

12. The data transmission system of claim 8, wherein the asynchronous FIFO memory updates a write pointer which is represented by a plurality of bits in response to a write operation of the master device, updates a read pointer which is represented by a plurality of bits in response to a read operation of the slave device and generates a full flag according to the write pointer and the read pointer, wherein when the write pointer and the read pointer have same bits except for a most significant bit and a second most significant bit, the full flag is set to a predetermined value.

13. The data transmission system of claim 8, wherein the asynchronous FIFO memory updates a write pointer which is represented by a plurality of bits in response to a write operation of the master device, updates a read pointer which is represented by a plurality of bits in response to a read operation of the slave device and generates an empty flag according to the write pointer and the read pointer, wherein when the write pointer and the read pointer have same bits, the empty flag is set to a predetermined value.

14. The data transmission system of claim 8, wherein the asynchronous FIFO memory updates a write pointer in response to a write operation of the master device, updates a read pointer in response to a read operation of the slave device and generates a full flag according to the current depth, the write pointer and the read pointer, wherein when an absolute value of a difference between a value corresponding to the write pointer and a value corresponding to the read pointer is equal to the current depth, the full flag is set to a predetermined value.

* * * * *